(12) United States Patent  (10) Patent No.: US 6,473,371 B1
White  (45) Date of Patent: Oct. 29, 2002

(54) MEDIA HANDLING DEVICE HAVING REPLACEABLE MODULES

(75) Inventor: Joseph M. White, Windsor, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/503,458

(22) Filed: Feb. 14, 2000

(51) Int. Cl.$^7$ .............................................. G11B 17/22
(52) U.S. Cl. .................................................. 369/30.72
(58) Field of Search .......................... 369/36.01, 30.31, 369/30.32, 30.38, 30.39, 30.41, 30.42, 30.43, 30.44, 30.45, 30.51, 30.52, 30.54, 30, 30.2, 30.21, 30.22, 30.28, 30.29, 3, 30.33, 30.34, 30.35, 30.36, 30.37, 53.42, 53.38; 360/98.04, 98.01, 98.02, 98.03, 98.05, 98.06, 98.07, 98.08, 52.12, 52.13; 412/273; 700/228

(56) References Cited

U.S. PATENT DOCUMENTS

| | | | |
|---|---|---|---|
| 4,504,936 A | | 3/1985 | Faber et al. .................. 369/34 |
| 4,817,070 A | | 3/1989 | Hug et al. .................... 369/36 |
| 4,984,106 A | * | 1/1991 | Herger et al. ................ 360/92 |
| 5,285,333 A | | 2/1994 | Barr et al. ................... 360/92 |
| 5,303,214 A | * | 4/1994 | Kulakowski et al. ....... 235/385 |
| 5,373,489 A | | 12/1994 | Sato et al. ................... 369/36 |
| 5,548,567 A | | 8/1996 | Sawai ......................... 369/36 |
| 5,663,938 A | | 9/1997 | Dang et al. .................. 369/36 |
| 5,666,337 A | * | 9/1997 | Dang et al. .................. 360/92 |
| 5,870,245 A | | 2/1999 | Kersey et al. ................ 360/92 |
| 5,940,355 A | * | 8/1999 | Buckland et al. ........ 369/30.54 |
| 5,963,514 A | * | 10/1999 | Kanetsuku et al. ...... 369/30.34 |
| 5,991,256 A | * | 11/1999 | Nonaka et al. ............. 369/192 |
| 6,309,162 B1 | * | 10/2001 | White ..................... 360/98.05 |

FOREIGN PATENT DOCUMENTS

EP          0757351 A2    2/1997

OTHER PUBLICATIONS

U.S. patent application Ser. No. 09/137,350, filed Aug. 20, 1998 for "Modular Data Storage System" of Joseph White et al.
U.S. patent application Ser. No. 09/291,242, filed Apr. 13, 1999 for "Guidance System And Method For An Automated Media Exchanger" of Richard Lynn Gardner, Jr. et al.
U.S. patent application Ser. No. 09/045,134, filed Mar. 20, 1998 for "Multi–Plane Translating Cartridge Handling System" of Gregg S. Schmidtke et al.

* cited by examiner

Primary Examiner—Hoa T. Nguyen
Assistant Examiner—Tianjie Chen (57) ABSTRACT

A media exchange device having a removable media handling device is disclosed herein. The media exchanging device may comprise a plurality of library modules, a first module, a media handling device, and an error detector. The first module is located adjacent the library modules and is removable from the library modules. The media handling device is movable between the library modules and the first module. The error detector is operatively associated with the media handling device. The error detector has a first state and a second state, wherein the error detector is in the first state when no errors are detected in the media handling device by the error detector, and wherein the error detector is in the second state when an error is detected in the media handling device by the error detector. The media handling device is adapted to move to the first module when the error detector is in the second state. An operator then may replace the removable module, which in turn replaces the media handling device, without disassembling the media exchanging device.

20 Claims, 6 Drawing Sheets

MEDIA HANDLING DEVICE HAVING REPLACEABLE MODULES

TECHNICAL FIELD OF THE INVENTION

The present invention generally relates to a media handling device and, more particularly, to a media handling device having operating components that may be readily replaced by a user.

BACKGROUND OF THE INVENTION

An autochanger is a device that stores large amounts of data on a plurality of media pieces. The storage technique involves storing the plurality of media pieces within the autochanger and reading and writing data from and to the media pieces. The data may, as examples, be digital data in a binary format or analog data, such as audio recordings. The media pieces may, as examples, be digital linear tape cartridges or optical discs. One use of the autochanger is as a data backup device, such as to backup daily accounting information for a bank.

The autochanger is substantially automated. Thus, when it is used to backup data on a computer system, the backup process may be performed "after hours" when the computer system has little or no other usage. Thus, the after hours operation permits the data to be backed up without hindering the performance of the computer system or causing a burden on computer operators. In addition, the automation provides that personnel are not required to be in the vicinity of the autochanger to monitor its activities when it is in use.

Due to the crucial nature of some backup data, e.g., bank accounting information, it is imperative that the data be regularly backed up. For example, if a bank were not able to back up its accounting data on a regular basis and were to lose even one day of accounting information, the bank would incur substantial losses in attempting to recreate the data. Accordingly, it is imperative that the autochanger be reliable so that data may be reliably backed up on a regular basis.

The autochanger has three primary components, a media library, a media handling device, and a media player. The media library stores the media pieces in predetermined locations, sometimes referred to as bays. The media player reads data from and writes data to selected media pieces. The media player may, as examples, be a digital linear tape player or an optical disc player. The autochanger may have several media players operating therein. The media handling device transports selected media pieces between the media library and the media player.

The media handling device is an integral component of the autochanger. It serves to extract selected media pieces from selected bays and to insert the media pieces into the media player. Likewise, the media handling device serves to extract the media pieces from the media player and to return them to selected bays. Unlike the media players, there is generally only space within an autochanger for one media handling device to operate. Accordingly, should the media handling device become inoperative, the autochanger will be rendered inoperative.

There are several critical components comprising the media handling device that, upon the failure of one, may render the media handling device inoperative. For example, the media handling device has servo systems and drive mechanisms that move the media handling device throughout the autochanger. If a servo system or drive mechanism fails, the media handling device will be unable to move within the autochanger and the autochanger will be rendered inoperative. Position sensors associated with the media handling device indicate the position of the media handling device so that it may be accurately guided to a selected bay or a media player. If a position sensor fails, the autochanger will not be able to determine the position of the picker and, thus, the autochanger will be rendered inoperative. A media grasping mechanism extracts the media pieces from the bays or the media players and draws them into the media handling device for transport throughout the autochanger. Likewise, the grasping mechanism inserts the media pieces into the bays or media players. If the media grasping mechanism fails, the media handling device will be unable to extract or insert media pieces out of or into bays or media players, which will render the autochanger inoperative.

Because the media handling device is integral to the autochanger, it is generally not readily replaceable or repairable. Thus, upon the failure of the media handling device, an autochanger technician is typically required to take apart the autochanger to replace the media handling device. Accordingly, the autochanger will be rendered inoperative from the time the failure occurred until a technician is able to arrive at the autochanger, take the autochanger apart, and replace the media handling device. Therefore, the autochanger may be rendered inoperative for an extended period in which the data in the computer system will not be able to be backed up.

Therefore, a need exists for an autochanger having a redundant media handling device or a media handling device that may be readily exchanged by an autochanger operator.

SUMMARY OF THE INVENTION

A media exchange device having a removable media handling device is disclosed herein. The media exchanging device may comprise a plurality of library modules, a first module, a media handling device, and an error detector. The first module located adjacent the library modules and may be removable from the library modules. The media handling device may be movable between the library modules and the first module.

The error detector may be operatively associated with the media handling device. The error detector may have a first state and a second state, wherein the error detector is in the first state when no errors are detected in the media handling device by the error detector, and wherein the error detector is in the second state when an error is detected in the media handling device by the error detector. The media handling device may be adapted to move to the first module when the error detector is in the second state.

As described above, when the error detector detects an error in the media handling device, the media handling device moves or is moved to the first module, which is removable from the remaining modules. An operator may then replace the removable module, which in turn replaces the media handling device, without disassembling the autochanger.

DETAILED DESCRIPTION OF A PREFERRED EMBODIMENT

FIGS. 1 through 6, in general, illustrates a media exchanging device 100 comprising: at least one library module 122, 124; a first module 120 located adjacent the at least one library module 122, 124 and being removable from the at least one library module 122, 124; and a media handling device 200 being movable between the at least one library module 122, 124 and the first module 120. An error detector may be operatively associated with the media handling device 200, the error detector having a first state and a second state, wherein the error detector is in the first state when no errors are detected in the media handling device 200 by the error detector, and wherein the error detector is in the second state when an error is detected in the media handling device 200 by the error detector. The media handling device 200 may be adapted to move to the first module 120 when the error detector is in the second state.

FIGS. 1 through 6 also, in general, illustrate a method for removing a media handling device 200 from an autochanger 100. The autochanger 100 may be of the type comprising at least one library module 122, 124. The method may comprise: providing at least one first module 120 located adjacent the at least one library module 122, 124; providing a channel 154 between the at least one library module 122, 124 and the at least one first module 120, the channel 154 being sized to allow the media handling device 200 to move within the channel 154; providing an error detector, the error detector being in a first state when no errors are detected in the media handling device 200 and in a second state when errors are detected in the media handling device 200; moving the media handling device 200 to the first module 120 when the error detector is in the second state; and removing the at least one first module 120 from the proximity of the at least one library module 122, 124.

Having generally described the autochanger 100, it will now be described in greater detail.

Figure 1:
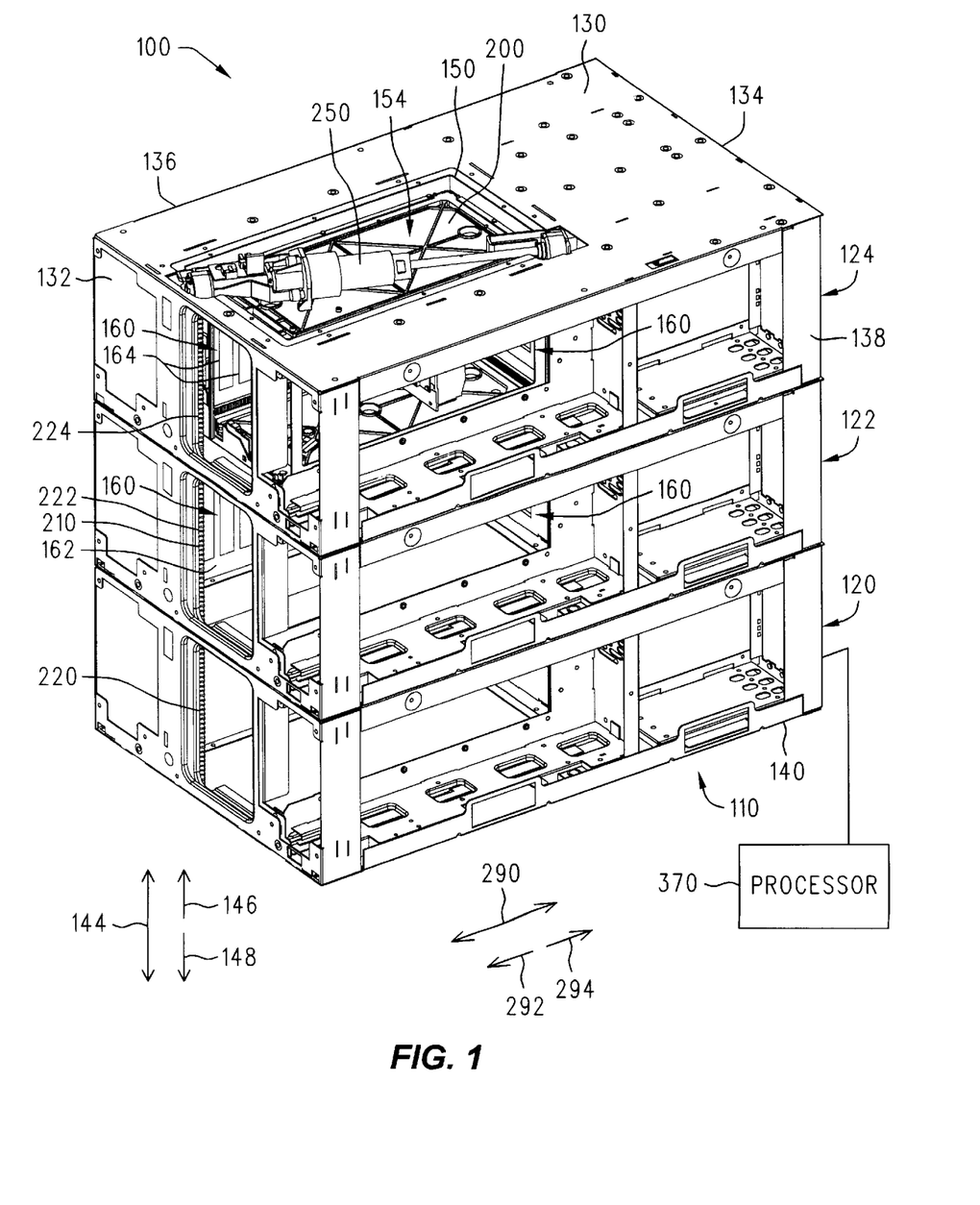
FIG. 1 is top perspective view of a stackable autochanger comprising a plurality of library modules.

Referring to FIG. 1, which is a top perspective view of a stackable autochanger 100, the autochanger 100 may have a plurality of adjacently stacked modules 110. The autochanger 100 illustrated in FIG. 1 has three modules, a first module 120, a second module 122, and a third module 124. Except for the addition of the first module 120, as described below, the autochanger 100 may be of the type disclosed in the U.S. patent application, Ser. No. 09/137,350 for MODULAR DATA STORAGE SYSTEM of Joseph White, et al., filed on Aug. 20, 1998, which is hereby incorporated by reference for all that is disclosed therein.

With reference to the third module 124, each module may have a top portion 130, a front portion 132, a back portion 134, a left portion 136, and a right portion 138. With reference to the first module 120, each module may also have a bottom portion 140. The modules 110 may be arranged so that the bottom portion 140 of one module is adjacent the top portion 130 of an adjacent module. Accordingly, the modules 110 may be arranged in a vertical direction 144. The top portion 130 and the bottom portion 140 of each module may have an opening 150 formed therein. The stacked arrangement of the modules 110 forms a shaft 154 by virtue of the openings 150, wherein the shaft 154 extends in the vertical direction 144 between the modules 110.

The second module 122 and the third module 124 may have a plurality of libraries 160 located therein. The libraries 160 may substantially encompass the shaft 154 so as to be adjacent to the left portions 136, the back portions 134, and the right portions 138 of the first and second modules 122, 124. It should be noted that for illustration purposes, no libraries are illustrated as being located adjacent the right portions 138 of the modules 122, 124 illustrated herein. The libraries 160 may have surfaces 162 that face into the modules toward the shaft 154. The surfaces 162 may have a plurality of openings 164 or bays which serve to retain media pieces, not shown, within the libraries 160. As will be described below the autochanger 100 transports the media pieces between the libraries 160 and media players, not shown. The media player may, as an example, be located in a module that is adjacent the modules 110 or it may be located within the a module 110. The media pieces may, as examples, be digital linear tape cartridges or optical media.

A cartridge retrieval mechanism 200 (sometimes referred to as a media handling device) and its associated components may also be located within the autochanger 100. More specifically, the cartridge retrieval mechanism 200 may be located within the shaft 154. As will be described in greater detail below, the cartridge retrieval mechanism 200 may move on a first track 210 that extends in the vertical direction 144. The first track 210 may be located in the vicinity of the sides of the openings 150 so as to be located in the vicinity of the side of the shaft 154. The first track 210 may be comprised of a plurality of individual track portions that are attached to the individual modules 110. The first module 120 may have a first track portion 220 attached thereto, the second module 122 may have a second track portion 222 attached thereto, and the third module 124 may have a third track portion 224 attached thereto. As will be described below, the first track 210 may serve as gear mechanism that, in conjunction with a gear attached to the cartridge retrieval mechanism 200, allows the cartridge retrieval mechanism 200 to move in the shaft 154 between the modules 110.

Figure 2:
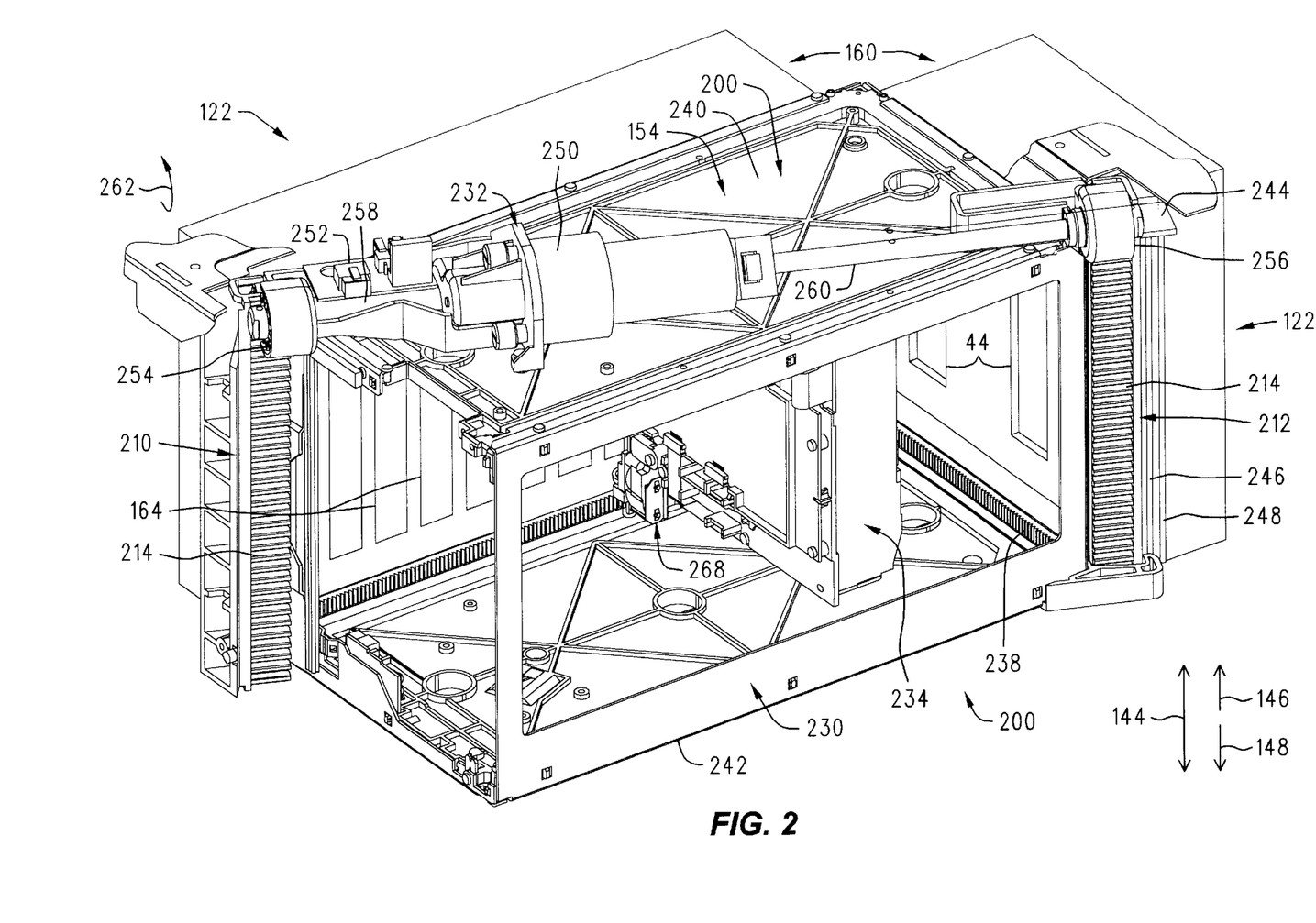
FIG. 2 is a partial, cut away, top perspective view of a library module illustrated in the autochanger of FIG. 1 with a cartridge retrieval mechanism located therein.

Referring to FIG. 2, which is a top perspective, cut away view of the second module 122, a second track 212 may be located on the side of the shaft 154 and may be parallel to the first track 210. As with the first track 210, the second track 212 may be comprised of a plurality of track portions, wherein a track portion is attached to each module. Accordingly, the track attached to the second module 122 is only a portion of the second track 212. The second track 212 may be substantially similar to the first track 210, thus, descriptions of the first track 210 apply to the second track 212.

Figure 3:
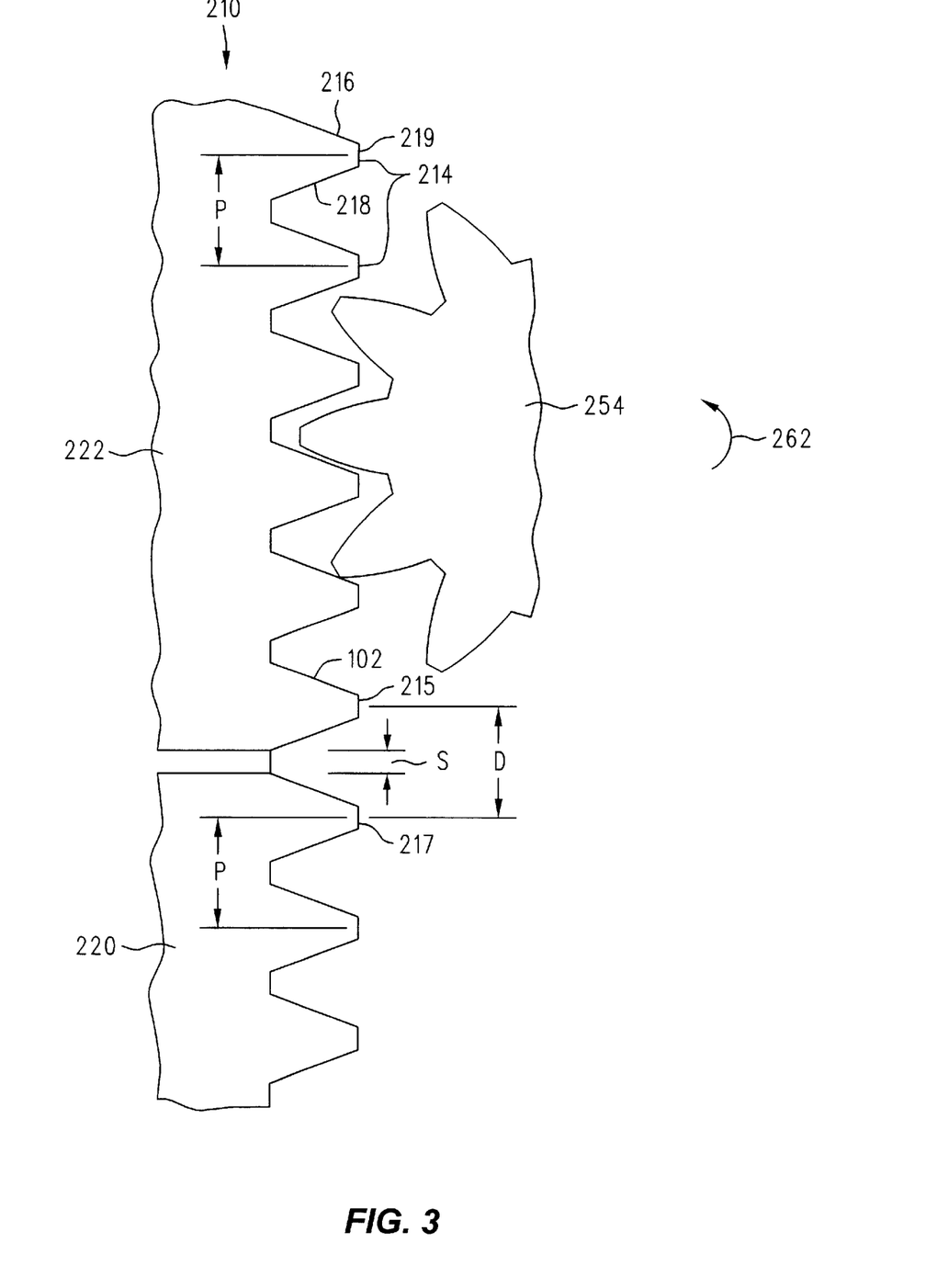
FIG. 3 is an expanded, side cut away view of a track illustrated in the autochanger of FIG. 1.

Referring to FIG. 3, which is an enlarged side view of the first track portion 220 and the second track portion 222, the first track 210 may have a plurality of evenly spaced teeth 214. Each tooth may have an upper slope 216, a lower slope 218, and a crest 219. The crests 219 on the teeth 214 of both the first track portion 220 and the second track portion 222 may be separated by a space P. The second track portion 222 may have a lower crest 215 and the first track portion 220 may have an upper crest 217, wherein the lower crest 215 is adjacent the upper crest 217. When the second module 122, FIG. 1, is stacked onto the first module 120, FIG. 1, the second track portion 222 may be separated from the first track portion 220 by a distance S. The distance S causes the lower crest 215 of the second track portion 222 to be separated from the upper crest 217 of the first track portion 220 by a distance D. Ideally, the distance D is equal to the space P, which allows for the continuity of even spacing of the teeth 214 throughout the first track 210. Achieving the distance D may be accomplished by locating the first track portion 220 and the second track portion 222 at predetermined locations on the first module 120, FIG. 1, and the second module 122, FIG. 1. The first module 120, FIG. 1, and the second module 122, FIG. 1, may then be stacked so as to be a predetermined distance from each other, which yields the distance D.

Referring again to FIG. 2, a first rail 246 and a second rail 248 may extend the length of the shaft 154. The first and second rails 246, 248 may be electrically conductive members that are adapted to have an electric potential across them. The electric potential may serve to provide electric current to the cartridge retrieval mechanism 200 as is described in greater detail below. All of the modules 110, FIG. 1, may have rails similar to the first and second rails 246, 248. The rails of the different modules 110, FIG. 1, may make electric contact when the modules 110 are stacked. For example, plugs or contacts, not shown, may provide for electric continuity between the rails. Accordingly, the rails of one module do not necessarily have to physically contact rails of an adjacent module.

Referring again to the cartridge retrieval mechanism 200 of FIG. 2, the cartridge retrieval mechanism 200 may comprise a chassis 230, a servo 232, and a picker 234. The chassis 230 may be a structure that serves to support the servo 232 and the picker 234. The chassis 230 may have a top portion 240, a bottom portion 242, and structural members extending therebetween. The chassis 230 may have a third track 238 located proximate the bottom portion 242 and running partially around the perimeter of the chassis 230. A fourth track, not shown, may be located proximate the top portion 240 and may run partially around the perimeter of the chassis 230. As will be described below, the third track 238 and the forth track allow the picker 234 to move within the chassis 230.

The servo 232 (sometimes referred to as a transport mechanism) may be attached to the top portion 240 of the chassis 230 and may serve to move the cartridge retrieval mechanism 200 within the shaft 154. The servo 232 may have a motor 250, an electronic control 252, a first gear 254, a second gear 256, a first shaft 258, and a second shaft 260. The motor 250 may be rigidly attached to the top portion 240 of the chassis 230 so that the servo 232 does not twist relative to the chassis 230 when it is in use. The motor 250 may receive instructions as to which way to rotate and how fast to rotate from the electronic control 252. The instructions may be in the form of voltages that provide electric power to the motor 250. The motor 250 may have two diametrically disposed outputs to which the first shaft 258 and the second shaft 260 are attached. The first shaft 258 may be attached to the first gear 254, which meshes with the first track 210 in a conventional manner. The second shaft 260 may be attached to the second gear 256, which meshes with the second track 212 in a conventional manner. As will be described in greater detail below, as the motor 250 rotates, it causes the shafts 258, 260 to rotate the gears 254, 256. The rotation of the gears 254, 256 causes the cartridge retrieval mechanism 200 to travel in the vertical direction 144. The vertical direction 144 may comprise a positive vertical direction 146 and a negative vertical direction 148.

In addition to the above-described components, brushes 244 may be attached to the servo 232. The brushes 244 may be electrically connected to the electronic control 252. The brushes 244 may serve to electrically contact the first rail 246 and the second rail 248 in a conventional manner as the cartridge retrieval mechanism 200 moves in the shaft 154. This electric contact provides electric current to the cartridge retrieval mechanism 200 during its operation. Control signals may, as an example, pass between the brushes 244 and the electronic control 252 via wires, not shown.

The motor 250 may, as an example, be a servo motor. The motor 250 may be of the type that is able to be rotated when power is removed from it. Accordingly, when power is removed from the motor 250, the motor 250 will rotate, causing the cartridge retrieval mechanism 200 to fall in the negative vertical direction 148 into the first module 120, FIG. 1. In order to slow the fall, the field of the motor 250 may be shorted upon the removal of power, which causes the motor 250 to act as a brake for the falling cartridge retrieval mechanism 200. The first module 120 of the autochanger 100 illustrated in FIG. 1 is located below the remaining modules, thus, the cartridge retrieval mechanism 200 will fall into the first module 120 regardless of whether or not the field of the motor 250 is shorted.

The picker 234 is a device that inserts and extracts media pieces from the openings 164 in the libraries 160. The picker may be of the type disclosed in the U.S. patent application, Ser. No. 09/291,242 for GUIDANCE SYSTEM AND METHOD FOR AN AUTOMATED MEDIA EXCHANGER of Richard L. Gardner, et al., filed on Apr. 13, 1999, which is hereby incorporated by reference for all that is disclosed therein. The relation of the picker 234 to the chassis 230 is illustrated in greater detail in FIG. 4, which is a top perspective view of the cartridge retrieval mechanism 200 with the servo 232 removed. The picker 234 may be a substantially parallel-piped device having an opening 276 formed therein. The opening 276 may be appropriately sized to accommodate a media piece. A transport servo 270 may also be attached to the picker 234. The transport servo 270 may have a drive mechanism 272 with a first drive gear 278 and a second drive gear 280 attached thereto. The first drive gear 278 may mesh with the third track 238. The second drive gear 280 may mesh with the forth track, which is not shown, that extends parallel to the third track 238. As will be described in greater detail below, the transport servo 270, in conjunction with the drive mechanism 272 and the gears 278, 280 serves to move the picker 234 within the chassis 230.

Figure 4:
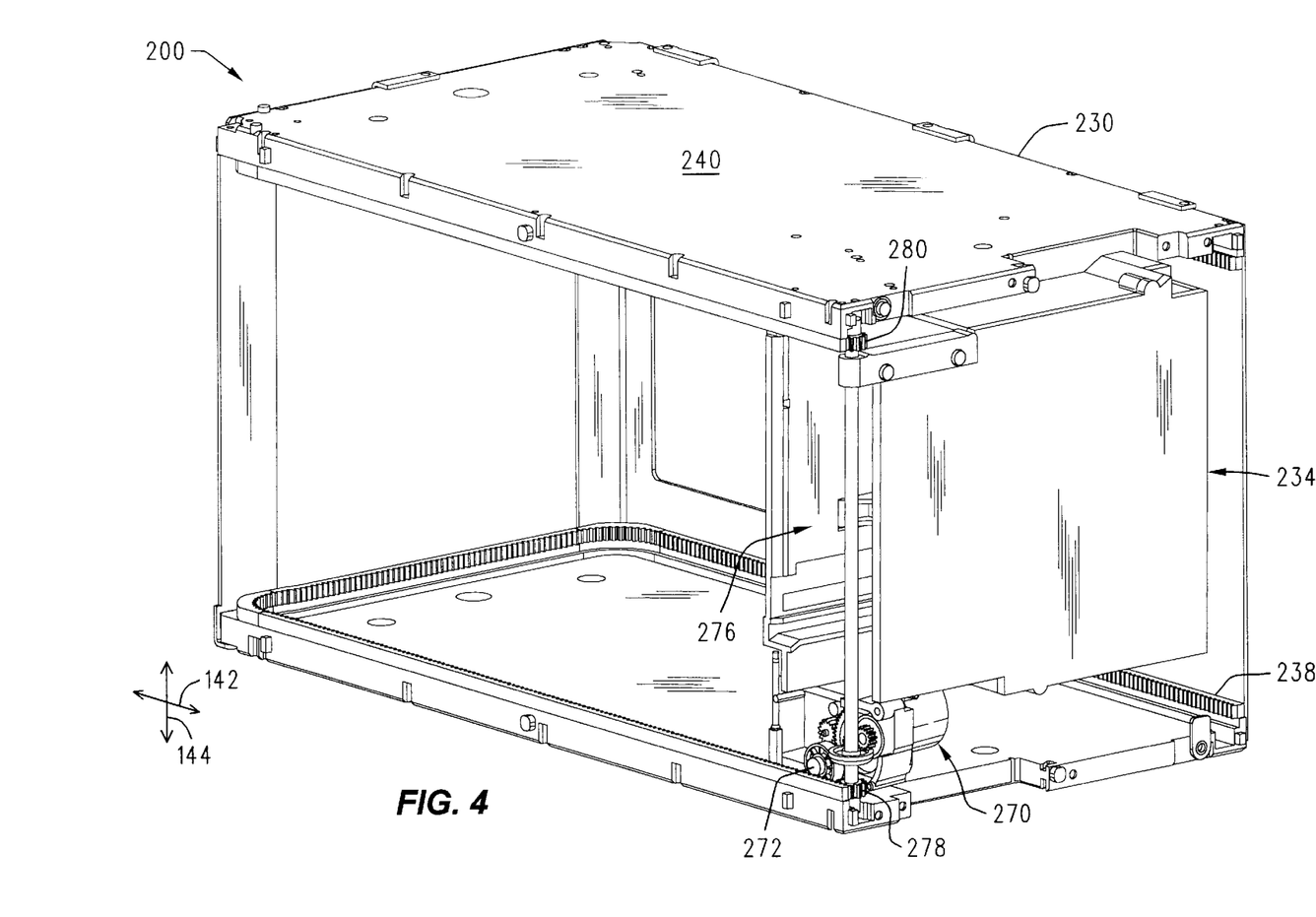
FIG. 4 is a top perspective view of the cartridge retrieval mechanism illustrated in the module of FIG. 2.
Figure 5:
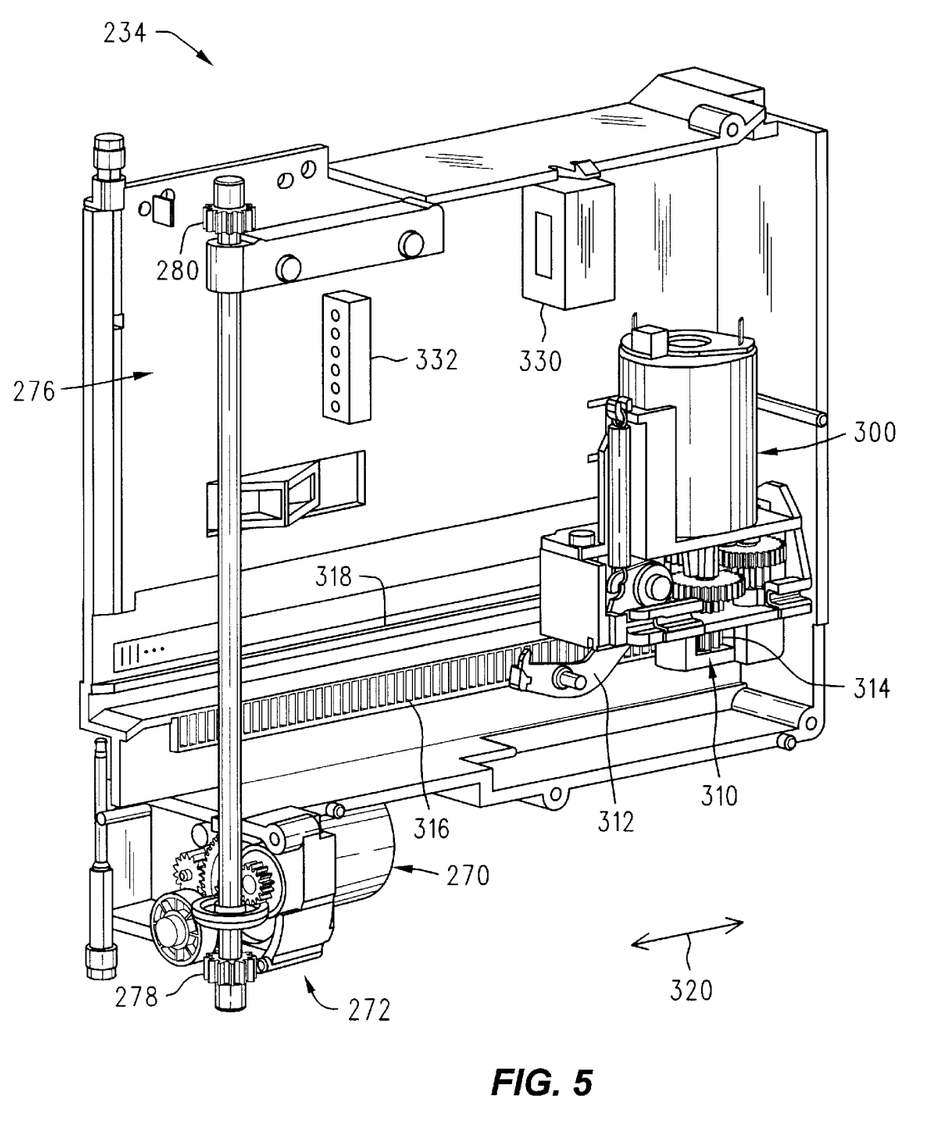
FIG. 5 is a cut away view of a picker illustrated in the cartridge retrieval mechanism of FIG. 4.

Referring to FIG. 5, which is a cut away view of the picker 234 of FIG. 4, the picker 234 may have various mechanical and optical components located therein. The mechanical components may extend from the opening 276 to insert and extract media pieces to and from the openings 164, FIG. 2, in the libraries 160. The optical components may serve to identify media pieces and to determine the position of the picker 234 relative to the autochanger 100, FIG. 1. The mechanical components may include a picker servo 300, a drive mechanism 310, a cartridge holding mechanism 312, a picker track 316, and a picker guide 318. The picker servo 300 may be operatively associated with the drive mechanism 310, wherein the picker servo 300 moves gears within the drive mechanism 310. The drive mechanism 310 may have a gear 314 that meshes into the picker track 316. The drive mechanism 310 may also have a tab, not shown, that extends into the picker guide 318, wherein the tab is movable in a direction 320 relative to the picker guide 318. The picker servo 300 may cause gears in the drive mechanism 310 to rotate the gear 314. The rotation of the gear 314 causes the cartridge holding mechanism 312 to move in the direction 320. The tab, not shown, causes the cartridge holding mechanism 312 to move linearly in the direction 320. As will be described below, the cartridge holding mechanism 312 may serve to grasp media pieces in order to insert and extract the media pieces into and out of the openings 164, FIG. 2, in the libraries 160. An example of a picker 234 is disclosed in the U.S. patent application, Ser. No. 09/045,134 of Gregg. S. Schmidtke et al., for MULTI-PLANE TRANSLATING CARTRIDGE HANDLING SYSTEM filed on Mar. 20, 1998 now U.S. Pat. No. 6,025,972, which is hereby incorporated by reference for all that is disclosed therein.

The autochanger 100, FIG. 1, may be of the type that uses media pieces having bar codes or other indicum attached thereto that identify the individual media pieces. In addition, the autochanger 100, FIG. 1, may be of the type that uses optical indicum to determine the location of the picker 234 relative to the libraries 160. Accordingly, the picker 234 may have a bar code reader 330 incorporated therein that identifies media pieces before they are extracted from the openings 164, FIG. 2, in the libraries 160. The bar code reader 330 may also be used to determine the location of the picker 234 relative to the libraries 160, FIG. 2, in both a horizontal direction 290 and the vertical direction 144. Alternatively, position sensing may be accomplished through a separate conventional mechanical device, not shown. The picker 234 may have an illuminator 332 that illuminates indicia that are to be imaged by the bar code reader. Without illumination, the bar code reader 330 is typically rendered inoperative. An example of a bar code reader and an optical position sensor incorporated into a picker device is described in the U.S. patent application, Ser. No. 09/291,242 of Gardner et al, previously referenced.

Referring again to FIG. 1, the first module 120 may be constructed without libraries, such as without the libraries 160 previously described with respect to the other modules. The first module 120 may be a module that serves to contain the cartridge retrieval mechanism 200 in the event a fault is detected in the cartridge retrieval mechanism 200. The first module 120 may be readily removed from the autochanger 100, which in turn removes the cartridge retrieval mechanism 200 from the autochanger 100. Removal of the first module 120 may be accomplished by having the first module 120 slidable in the horizontal direction 290 relative to the remaining modules. The first module 120 is illustrated herein as being substantially the same size as the remaining modules. The first module 120, however, only needs to be large enough to enable it to contain the cartridge retrieval mechanism 200 because it does not need to have space to contain libraries.

Alternatively, the first module 120 may contain accessories. For example, a mail slot may be located in the 120. The mail slot serves as a temporary holding location for media pieces. The cartridge retrieval mechanism 200 may exchange media pieces between the libraries 160 in the modules and the mail slot. The mail slot may also contain media pieces that serve to clean components in the media player rather than hold media. Thus, the cartridge retrieval mechanism 200 may move these pieces to the media player in order to clean the media player.

Figure 6:
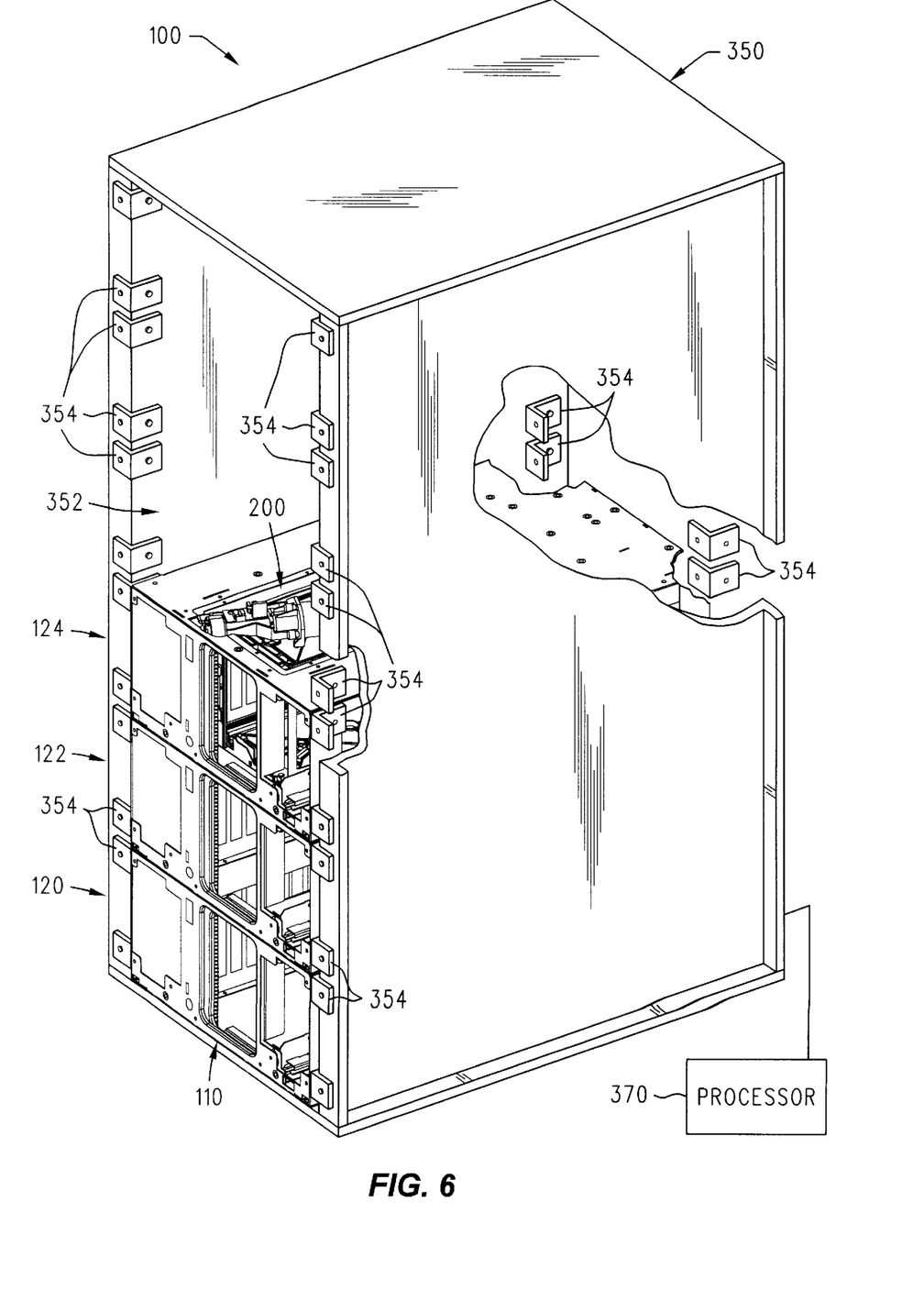
FIG. 6 is a top perspective view of the stackable autochanger of FIG. 1 enclosed in a housing.

Referring to FIG. 6, the modules 110 may be located in a housing 350. The housing 350 may be a conventional housing that supports electronic modules. The housing 350 may have an opening 352 with a plurality of securing mechanisms 354 attached to the housing 350 at the periphery of the opening 352. The securing mechanisms 354 may also be located inside the housing 350. The securing mechanisms 354 may, as an example, be screws that secure the modules 110 to the housing 350. In another example, the housing 350 may have slides that serve to slidably attach the modules 110 to the housing 350 in a conventional manner.

Other conventional components, not shown, may be located within the housing 350. For example, a power supply and electronic controllers for the cartridge retrieval mechanism 200 may be located in the housing 350. In addition, status indicators, not shown, may be incorporated into or attached to the housing. The status indicators may, as an example, indicate whether a fault exists with the cartridge retrieval mechanism 200, FIG. 1.

An external processor 370 may be electrically connected to the autochanger 100. The external processor 370 may serve to control the operation of the autochanger 100. For example, the external processor 370 may serve to instruct the cartridge retrieval mechanism 200 and the picker 234, FIG. 2, where to go within the autochanger 100. Referring to FIG. 5, the external processor 370 may provide instructions to the drive mechanism 272, the picker servo 300, and the illuminator 332. The external processor 370 may also analyze data generated by the bar code reader 330. Referring to FIG. 2, the external processor 370 may provide instructions to the electronic control 252 indicating which way and how fast the motor 250 should rotate. The external processor 370 may also monitor the systems within the autochanger 100 to determine if a fault or error is present in the cartridge retrieval mechanism 200. Accordingly, the external processor 370 may serve as an error detector. The external processor 370 or the autochanger 100 itself may have an indicator, e.g., a light, that indicates when a fault has been detected with the cartridge retrieval mechanism 200. It should be noted that many of the functions described herein as being performed by the external processor 370 may be performed by an internal processor, not shown.

Conventional sensors throughout the autochanger 100 may be associated with the external processor 370 to detect errors in the various components of the cartridge retrieval mechanism 200. For example, an ammeter may be located between a power source and the illuminator 332, FIG. 5. If the illuminator 332 has been instructed to illuminate and no current is passing to the illuminator 332, the illuminator 332 is not operating. The external processor 370 can monitor the ammeter to determine if the illuminator 332 is operating. In another example, if the servo 232, FIG. 2, is instructed to move the cartridge retrieval mechanism 200 and the position sensor, not shown in FIG. 2, does not detect any movement, it is presumed that an error exists with the servo 232, its components, or the position sensor.

Having described the components comprising an embodiment of the autochanger 100, the operation of the autochanger 100 will now be described.

Referring to FIG. 1, in normal operation, the cartridge retrieval mechanism 200 is stored in the first module 120. Storing the cartridge retrieval mechanism 200 in the first module 120 is preferred because the cartridge retrieval mechanism 200 drops to the first module 120 when power is removed from the motor 250. Extraction of a media piece commences with the external processor 370 transmitting instructions to the cartridge retrieval mechanism 200, which ultimately instruct the cartridge retrieval mechanism 200 to retrieve a media piece from an opening 164 and to insert the media piece into a media player, not shown. Likewise, the external processor 370 may also transmit instructions to the cartridge retrieval mechanism 200 to retrieve a media piece from a media player and to insert the media piece into an opening 164.

More specifically, when a media piece is required to be transported from an opening 164 to a media player, the external processor 370 instructs the cartridge retrieval mechanism 200 to move in the positive vertical direction 146 from the first module 120 to the module housing the media piece. Referring to FIG. 2, the instructions may be transmitted to the electronic control 252 on the servo 232. The transmission may, as examples, be accomplished via infrared or radio frequency transmission. The electronic control 252 translates the instructions from the external processor 370 into commands for the motor 250, which in this example cause the motor 250 to rotate the first and second shafts 258, 260 in a direction 262. Accordingly, the first and second gears 254, 256 rotate in the direction 262 relative to the first and second tracks 210, 212, which causes the cartridge retrieval mechanism 200 to move in the positive vertical direction 146 out of the first module 120.

Referring again to FIG. 1, as the cartridge retrieval mechanism 200 moves from the first module 120 to the second module 122, it must pass from the first track portion 220 to the second track portion 222. This transition is accomplished by the placement of the first track portion 220 relative to the second track portion 222 as illustrated in FIG. 3. Because the distance D is approximately equal to the distance P, the first gear 254 continues to mesh in the first track 210 without interruption as it passes from the first track portion 220 to the second track portion 222. The same transition of the first track 210 occurs when the cartridge retrieval mechanism 200 passes between any of the modules 110. The same transition also occurs with regard to the second track 212, FIG. 2.

Referring again to FIG. 2, electricity is supplied to the cartridge retrieval mechanism 200 by the first and second rails 246, 248. In the event a small gap is present between the rails on the first module 120, FIG. 1, and the rails 246, 248 on the second module 122 the brushes 244 may bridge the gap. Accordingly, the cartridge retrieval mechanism 200 does not encounter any loss of power as it passes from the first module 120, FIG. 1, to the second module 122. Alternatively, each module 110, FIG. 6, may provide electric power to the rails by having the modules 110 plug into electric sockets in the housing 350, FIG. 6.

As the cartridge retrieval mechanism 200 moves from the first module 120 to the second module 122, the picker 234 moves to a position where it will be adjacent the opening 164 containing the media piece that is to be extracted. Referring to FIG. 4, the transport servo 270 supplies power to the drive mechanism 272, which causes the first drive gear 278 and the second drive gear 280 to rotate. The rotation of the first drive gear 278 and the second drive gear 280 causes the picker 234 to move relative to the third track 238 and the forth track associated with the second drive gear 280.

When the opening 276 is adjacent the media piece that is to be extracted, the bar code reader 330 may verify that the correct media piece is being extracted by reading its bar code label. In order to read the bar code label, the illuminator 332 provides light, which illuminates the bar code label in a conventional manner. The light reflects from the bar code label and is received by the bar code reader 330. The bar code reader 330 then reads the bar code label in a conventional manner. If the opening 276 is adjacent the correct media piece, the picker 234 extracts the media piece. Extraction is accomplished by the picker servo 300 providing power to the drive mechanism 310, which causes the gear 314 to rotate relative to the picker track 316. The rotation of the gear 314 causes the cartridge holding mechanism 312 and its associated components to move toward the opening 276. The cartridge holding mechanism 312 and its associated components are guided by a tab, not shown, that extends into the picker guide 318. When the cartridge holding mechanism 312 is adjacent the media piece, it moves to grasp the media piece. When the media piece has been grasped, the picker servo 300 rotates the gear 314 in the opposite direction to draw the media piece through the opening 276 and into the picker 234.

Referring again to FIG. 1, when the cartridge retrieval mechanism 200 has extracted a media piece, it moves the media piece to a media player. When the cartridge retrieval mechanism 200 is adjacent the media player, the picker 234 inserts the media piece into the media player. The above-described process may be used to extract a media piece from a media player and to insert the media piece into an opening 164.

Per the process described above, it can be appreciated that the cartridge retrieval mechanism 200 relies on several components. If one of these components fails, the cartridge retrieval mechanism 200 and, thus, the autochanger 100 will fail. Several examples of component failures are illustrated below. Should any of these components fail, the autochanger 100 will be rendered inoperative. For example, referring to FIG. 2, if the servo 232 or any of its components fail, the cartridge retrieval mechanism 200 will not be able to move in the vertical direction 144 and the autochanger 100 will be rendered inoperative. Referring to FIG. 5, if the bar code reader 330 or the illuminator 332 fail, the bar codes affixed to the media pieces will not be able to be read. Accordingly, the autochanger 100, FIG. 1, will not be able to determine the identity of the media pieces and will be rendered inoperative. In the embodiment where the bar code reader 330 is used for position sensing, failure of the bar code reader 330 will cause the autochanger 100, FIG. 1, to be unable to determine the location of the cartridge retrieval mechanism 200, which will render the autochanger 100 inoperative. If the transport servo 270 or any of its associated components fail, the picker 234 will not be able to move within the cartridge retrieval mechanism 200, FIG. 2. Again, the picker 234 will not be able to transport media pieces and the autochanger 100 will be rendered inoperative. If the picker servo 300 or any of its associated components fail, the picker 234 will not be able to extract media pieces from or insert them into openings 164, FIG. 1, or media players, which again will render the autochanger 100 inoperative.

The external processor 370 monitors the above components to determine if a fault is present. For example, after the external processor 370 instructs the cartridge retrieval mechanism 200 or the 234, FIG. 2, to move, the external processor 370 may monitor the position sensor to verify that the components have moved properly. If proper movement cannot be confirmed, the external processor 370 makes the determination that a fault has occurred with the cartridge retrieval mechanism 200 or the position sensor. Referring to FIG. 5, conventional switches may be located in the picker 234 that toggle upon contact with the cartridge holding mechanism 312. The toggling switches confirm that the picker servo 300 and the cartridge holding mechanism 312 move properly upon receiving instructions from the external processor 370, FIG. 1.

Upon detection of a fault, the external processor 370 instructs the cartridge retrieval mechanism 200 to move into the first module 120. An indication, such as an illuminated light, may indicate to the user that the cartridge retrieval mechanism 200 has a fault and that it is located in the first module 120. In the event the fault is related to a loss of power to the cartridge retrieval mechanism 200, the vertical stacking of the modules 110 causes the cartridge retrieval mechanism 200 to fall into the first module 120 upon the loss of power. The field in the motor 250 may also be shorted in order to cause the motor 250 to function as a brake, thus, slowing the descent of the cartridge retrieval mechanism 200 into the first module 120.

When the faulty cartridge retrieval mechanism 200 is located in the first module 120, the cartridge retrieval mechanism 200 may be readily replaced by replacing the first module 120. Referring to FIG. 6, the first module 120 may be slid out of the housing 350 in a conventional manner. The cartridge retrieval mechanism 200 is located in the first module 120 and is, thus, removed from the autochanger 100 along with the first module 120. A new first module 120 with a functional cartridge retrieval mechanism 200 located therein may then be slid into the housing 350.

Referring to FIG. 2, the new first module has a first and second track 210, 212 that readily align with the first and second track in the second module 122. Thus, the first and second gears 254, 256 readily mesh in the first and second tracks 210, 212. Likewise, the first and second rails 246, 246 in the first module align with the first and second rails in the second module 122. For example, the rails may have portions that extend beyond the modules 110, thus, when the modules 110 are aligned, the rails contact each other. Thus, electricity may be provided to the cartridge retrieval mechanism 200 located in the first module.

Referring again to FIG. 1, the autochanger 100 is now ready for operation with only a delay of the time required to exchange the first module 120. The cartridge retrieval mechanism 200 may be repaired external to the autochanger 100 without hindering the operation of the autochanger 100.

Having described an embodiment of the autochanger 100, other embodiments will now be described.

The autochanger 100 has been described as having a single first module 120 located at the bottom of the stack of modules 110. In another embodiment of the autochanger 100 the first module 120 may be located above the stack of modules 110. For example, referring to FIG. 1, the first module 120 may be located above the third module 124.

In another embodiment of the autochanger 100, a second first module may be located above the third module 124 and may have a second cartridge retrieval mechanism 200 located therein. Thus, if one cartridge retrieval mechanism 200 fails, it may drop into the first module 120 located under the second module 122. The cartridge retrieval mechanism 200 from the first module 120 located above the third module 124 may then proceed to operate in the autochanger 100. In this embodiment, the autochanger 100 has very little down time in the event of a failure of the cartridge retrieval mechanism 200 because the second cartridge retrieval mechanism 200 is in place for operation in the autochanger 100.

Each cartridge retrieval mechanism 200 may have a different identification, such as a different address. Control signals transmitted within the autochanger 100 may use the different address to control the different cartridge retrieval mechanisms 200. Accordingly, the two cartridge retrieval mechanisms 200 will be able to be controlled individually.

The autochanger 100 has been described as having a first rail 246, FIG. 2, and a second rail 248 extending between all the modules 110. It is to be understood that electrical contact does not have to exist between the first rail 246 of each module 110 or the second rail 248 of each module 110. Rather the first rail 246 of each module 110 may be electrically connected to a contact located in the back portion 134, FIG. 1, of each module 110. Likewise, the second rail 248 of each module 110 may be electrically connected to a second contact located in the back portion 134, FIG. 1, of each module 110. A plurality of electric contacts may be located in the housing 350, FIG. 6, so as to contact the above described first and second contacts located in the back portion 134 of each module 110. The module contacts may, as an example, plug into the housing contacts. Accordingly, each module 110 is powered separately and the rails 246, 248 do not have to be in electric contact between modules 110. In addition, the plugs allow the first module 120 to be readily removed from the housing 350.

In another embodiment of the autochanger 100 electric power and/or instructions are provided to the cartridge retrieval mechanism 200, FIG. 1, by a cable. For example, referring to FIGS. 1 and 6, the cable may extend from the housing 350, through the shaft 154 and to the cartridge retrieval mechanism 200. The interface between the cable and the cartridge retrieval mechanism 200 may be provided by a conventional plug and socket, thus, the cartridge retrieval mechanism 200 may be readily removed from the cable. As the cartridge retrieval mechanism 200 moves in the vertical direction 144, the cable may coil or uncoil in order to prevent it from becoming bound between the cartridge retrieval mechanism 200 and the modules 110. The cable may also fold and unfold in order to prevent it from becoming bound up within the autochanger 100.

As was described above, the autochanger 100 needs to know the position of the picker 234, FIG. 5, in order for the autochanger 100 to instruct the picker 234 as where to move. Several mechanical position sensing devices are known in the art that may achieve this task. Position sensing may also be accomplished by use of an optical positioning system as is disclosed in the U.S. patent application, Ser. No. 09/291, 242 of Gardner et al, previously referenced.

The autochanger 100 has been described herein as having several library modules 110 that are vertically stacked. It is to be understood that the autochanger 100 may have libraries that are located adjacent each other in a horizontal direction. The autochanger 100 may also be of the type comprising a single library or it may have more modules 110 than has been illustrated herein. A removable module may then be attached to the single library to store the cartridge retrieval mechanism. Upon failure of the cartridge retrieval mechanism the removable module may be replaced, which replaces the cartridge retrieval mechanism.

Some autochangers have a single library module with a cartridge retrieval mechanism located therein. The first module may be much smaller than the single library module and may be located adjacent a plurality of areas of the single library module. For example, the first module may be located adjacent a side or the bottom of the single library module. The single library module may also have a plurality of first modules located adjacent the single library module.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A media exchanging device comprising:
   at least one library module;
   a first module located adjacent said at least one library module and being removable from said at least one library module;
   a media handling device being movable between said at least one library module and said first module;

an error detector operatively associated with said media handling device, said error detector having a first state and a second state, wherein said error detector is in said first state when no error is detected in said media handling device by said error detector, and wherein said error detector is in said second state when an error is detected in said media handling device by said error detector; and wherein said media handling device is adapted to move to said first module when said error detector is in said second state.

2. The media exchanging device of claim 1 wherein said at least one library module comprises a plurality of adjacently located library modules.

3. The media exchanging device of claim 2 wherein said media handling device is movable within said plurality of library modules and said first module.

4. The media exchanging device of claim 2 wherein said plurality of adjacently located library modules are arranged in a vertical direction.

5. The media exchanging device of claim 4 wherein said plurality of adjacently located library modules have a top portion and a bottom portion, and wherein said first module is located adjacent said bottom portion of said plurality of adjacently located library modules.

6. The media exchanging device of claim 5 wherein said media handling device is supplied with electric current and wherein said media handling device descends to said first module upon the removal of said electric current.

7. The media exchanging device of claim 1 and further comprising a second module located adjacent said at least one library module, said second module being removable from said at least one library module.

8. The media exchanging device of claim 1 wherein said media handling device has a servo operatively associated therewith and wherein said error detector is operatively associated with said servo.

9. The media exchanging device of claim 1 wherein said media handling device has a position sensor operatively associated therewith and wherein said error detector is operatively associated with said position sensor.

10. The media exchanging device of claim 1 wherein said media handling device has a cartridge holding mechanism operatively associated therewith and wherein said error detector is operatively associated with said cartridge holding mechanism.

11. The media exchanging device of claim 1 wherein said media handling device has electric current supplied thereto and wherein said error detector is operatively associated with said electric current supplied to said media handling device.

12. The media exchanging device of claim 1 and further comprising a housing wherein said at least one library module and said first module are located in said housing.

13. A method for removing a media handling device from an autochanger, said autochanger being of the type comprising at least one library module, said method comprising:

providing at least one first module located adjacent said at least one library module;

providing a channel between said at least one library module and said at least one first module, said channel being sized to allow said media handling device to move within said channel;

providing an error detector, said error detector being in a first state when no errors are detected in said media handling device and in a second state when errors are detected in said media handling device;

moving said media handling device into said first module when said error detector is in said second state; and removing said at least one first module from the proximity of said at least one library module.

14. The method of claim 13, wherein said removing comprises replacing said at least one first module with a second at least one first module, wherein said second at least one first module has a media handling device located therein.

15. The method of claim 13 wherein said at least one library module has a lower side and wherein said providing at least one first module comprises providing at least one first module located adjacent said lower side.

16. The method of claim 13 wherein said media handling device is supplied with electric current and further comprising monitoring said electric current with said error detector.

17. The method of claim 13 wherein said media handling device has a servo operatively associated therewith and further comprising monitoring said servo with said error detector.

18. The method of claim 13 wherein said media handling device has a position sensor operatively associated therewith and further comprising monitoring said position sensor with said error detector.

19. The method of claim 13 wherein said media handling device has a cartridge holding mechanism operatively associated therewith and further comprising monitoring said cartridge holding mechanism with said error detector.

20. An autochanger comprising:

a library for storing media pieces;

a transport means operatively connected to said library for transporting said media pieces within said library;

at least one transport storage means for storing said transport means;

an error detection means for detecting errors in said transport means and instructing said transport means to move into said transport storage means upon the detection of an error therein; and wherein said at least one transport storage means is removable from said library.

* * * * *